(12) United States Patent
Quarless (10) Patent No.: US 11,957,267 B2
(45) Date of Patent: Apr. 16, 2024

(54) EGG APPARATUS

(71) Applicant: William A. Quarless, Kowloon (HK)

(72) Inventor: William Quarless, Kowloon (HK)

( * ) Notice: Subject to any disclaimer, the term of this patent is extended or adjusted under 35 U.S.C. 154(b) by 745 days.

(21) Appl. No.: 17/099,315

(22) Filed: Nov. 16, 2020

(65) Prior Publication Data

US 2022/0151427 A1 May 19, 2022

(51) Int. Cl.
*H05B 6/12* (2006.01)
*A47G 19/28* (2006.01)
*A47J 29/06* (2006.01)
*B65D 81/34* (2006.01)

(52) U.S. Cl.
CPC .............. *A47J 29/06* (2013.01); *A47G 19/28* (2013.01); *B65D 81/3453* (2013.01); *B65D 2581/3437* (2013.01)

(58) Field of Classification Search
CPC ........... A47G 19/28; A47J 29/02; A47J 29/06; B65D 2581/3437; B65D 81/3453
USPC ....... 219/731, 725, 732, 734, 441, 439, 401, 219/461; 99/336, 342, 403–418, 440, 99/431, 426–427, 448–450, 453
See application file for complete search history.

(56) References Cited

U.S. PATENT DOCUMENTS

| | | | | |
|---|---|---|---|---|
| 2,226,844 A | * | 12/1940 | Carr | A47J 29/00 249/55 |
| 2,761,375 A | * | 9/1956 | Jepson | A47J 29/00 99/344 |
| 2,807,701 A | * | 9/1957 | Conlin | A47J 29/06 392/338 |

* cited by examiner

*Primary Examiner* — Quang T Van
(74) *Attorney, Agent, or Firm* — Dan De la Rosa (57) ABSTRACT

An egg apparatus has a top shell and a bottom shell designed to attach and detach to one another and when attached, the shells form a sealed internal cavity, the top shell having at least one aperture and the bottom shell having a tray for receiving an egg, the bottom shell is designed to receive water which can be heated to cook the egg; and a pop valve designed to fit within the aperture of the first shell and allows steam to escape while keeping the water inside the internal cavity formed by the two shells.

19 Claims, 10 Drawing Sheets

EGG APPARATUS

BACKGROUND OF THE INVENTION

Field of the Invention

This invention relates to an egg apparatus. The egg apparatus is designed to receive water and at least one egg and cook the egg in a microwave using heat and steam. The egg apparatus uses a sealed internal cavity to optimally cook eggs. Once the egg is cooked, a user can cool the eggs off and then shake them inside the apparatus to easily remove the shell. The egg apparatus has a specially design pop valve that allows steam to escape during the cooking process but keeps water in during the shell removal process. The pop valve has a built-in safety feature that allows the entire pop valve to open up and release excess pressure in the event the valve becomes clogged or damaged.

Summary of the Invention

The following implementations and aspects thereof are described and illustrated in conjunction with systems, tools, and methods that are meant to be exemplary and illustrative, not necessarily limiting in scope. In various implementations one or more of the above-described problems have been addressed, while other implementations are directed to other improvements.

In one embodiment, an egg apparatus comprising at least two shells designed to attach and detach from another, the two shells forming a sealed internal cavity when attached to one another, the first shell having at least one aperture; a top tray, a bottom tray and an internal base designed to be received by said internal cavity, the bottom tray is designed to receive an egg, the second shell is designed to receive water which heated to cook the egg; a plurality of protrusions extending downwardly from the top tray, the protrusions are designed deshell the egg; a handle attached to one of said two shells; a lock designed to secure the two shells to one another to thereby form the sealed internal cavity; and a pop valve designed to fit within said aperture of the first shell, the pop valve is designed to let steam escape and keep water inside said internal cavity.

In another embodiment, an apparatus comprising at least one egg and water.

In yet another embodiment, wherein said first shell is the top shell and the second shell is the bottom shell when the two shells are attached to one another.

In still another embodiment, where the handle to directly attached to the bottom shell.

In still yet another embodiment, the designed to steam cook and deshell at least one egg in a microwave.

In a further embodiment, top tray at least one air passage.

In yet a further embodiment, wherein the bottom tray has at least one egg cup to receive an egg.

In still a further embodiment, the bottom tray as at least one vent.

In another embodiment, the bottom tray as a fill line indicator that indicates to a user how much water should be poured into the egg apparatus.

In still another embodiment, the pop valve comprises a device for releasing steam, the device is selected from a group comprising of slits, perforations, holes and combinations thereof.

In still yet another embodiment, the pop valve is designed to slide out of the aperture if too much pressure builds within said internal cavity.

In still a further embodiment, the bottom tray rests on the internal base.

In still yet a further embodiment, a top portion of the bottom shell comprises a channel, the channel is designed to receive at least one seal, the channel and seal are designed to receive a bottom portion of said top shell to create a water and steam tight seal for the internal cavity.

In another embodiment, the egg sits within the egg cup of the bottom tray, the top tray is placed over the bottom tray, the bottom tray sits on the internal base, the bottom trays and internal base are placed atop the bottom shell, water is poured into the bottom shell, the top tray and the top shell is attached to and locked onto the bottom shell creating a seal for the internal cavity, the apparatus is heated to allow the egg to cook, the apparatus is shaken to allow the protrusions to deshell the egg, and the top and bottom shells are unlocked and open to access the egg.

In yet another embodiment, an egg apparatus comprising a top shell and a bottom shell designed to attach and detach from another, the two shells forming a sealed internal cavity when attached to one another, the first shell having at least one aperture; a top shell comprising at least one tray, the bottom shell comprising at least one bottom tray and an internal base, the bottom tray is designed to receive an egg, the bottom shell is designed to receive water which is heated to cook the egg; a plurality of protrusions extending downwardly from the top tray, the protrusions are designed deshell the egg; a handle attached to said bottom shells; a lock designed to secure said two shells to one another to thereby form the sealed internal cavity; and a pop valve designed to fit within the aperture of said first shell, the pop valve is designed to let steam escape and keep water inside the internal cavity.

In a further embodiment, a bottom tray comprises at least one egg cup.

In still a further embodiment, wherein the bottom tray comprises a plurality of egg cups for holding a plurality of eggs.

In still yet a further embodiment, wherein the egg sits within the egg cup of the bottom tray, the top tray is placed over the bottom tray, the bottom tray sits on said internal base, the bottom trays and internal base are placed atop the bottom shell, water is poured into the bottom shell, the top tray and the top shell is attached to and locked onto the bottom shell creating a seal for the internal cavity, the apparatus is heated to allow the egg to cook, the apparatus is shaken to allow the protrusions to deshell the egg, and the top and bottom shells are unlocked and open to access the egg.

In another embodiment, wherein the pop valve comprises a device for releasing steam, the device is selected from a group comprising of slits, perforations, holes and combinations thereof.

In yet another embodiment, an egg apparatus comprising: a top shell and a bottom shell designed to attach and detach from another, the two shells forming a sealed internal cavity when attached to one another, the first shell having at least one aperture, the bottom shell comprising at least one tray, the tray is designed to receive an egg, the bottom shell is designed to receive water which is heated to cook the egg; and a pop valve designed to fit within said aperture of the first shell, the pop valve is designed to let steam escape and keep water inside the internal cavity.

BRIEF DESCRIPTION OF THE DRAWINGS

The accompanying drawings are included to provide a further understanding of the present invention. These drawings are incorporated in and constitute a part of this specification, illustrate one or more embodiments of the present invention and together with the description serves to explain the principles of the present invention.

Among those benefits and improvements that have been disclosed, other objects and advantages of this invention will become apparent from the following description taken in conjunction with the accompanying drawings. The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention that may be embodied in various forms. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

An egg apparatus 1 for cooking and peeling egg easily and efficiently. The egg apparatus 1, that is constructed of opposing shells, a first shell 3 and a second shell 5. The first shell 3 and second shell 5 form an internal cavity 2. The first shell 3 is designed to receive a top tray 11 and a pop valve 9 through the aperture 10 (or pop valve hole). The second shell 5 is designed to receive an internal base 17 and a bottom tray 13. The bottom tray 13 rests on the internal base 17.

The first shell 3 and second shell 5 are secured together by locks 7. The locks 7 are built into the handles 6 and connected to the handles via pivot points 8. A user can pivot the locks 7 upwards to move over lock protrusions 4 to secure the shells together.

The first shell 3 and second shell 5 once locked create a water tight apparatus that is created by an inner channel 18 located on the bottom shell 5 that receives a seal 19, the inner channel 18 and seal 19 are designed to receive the bottom of the first shell 3.

The pop valve 9 is designed to allow steam as it builds up during the cooking process to escape through a perforation or slits. The pop vale 9 is built as a safety mechanism, in the event that the perforation or seals become clogged, the entire pop valve 9 would slide up from the pressure and allow steam to escape thereby preventing the entire egg apparatus 1 from failing or even worse exploding. The pop valves 9 construction allows steam to escape as needed during cooking but keeps the water in during the peeling process.

The top tray 11 has peeling protrusions 20 located that allow a user to effortlessly peel the cooked eggs.

The egg apparatus 1 is designed for microwave use. A user pours water to the fill line indicator 16 that is located on the bottom tray 13. The bottom tray 13 has at least one egg cup 14 to receive eggs for cooking. The user then places the eggs in the egg cups 14 and then locks the egg cooking apparatus 1 and places it in a microwave.

After the eggs have been cooked a for the desired amount of time, the egg apparatus 1 is removed from the microwave and the user takes off the first shell 3. The user then pours cool water over the eggs and then leaves water in the second shell 5 and places the first shell 3 back on and locks the device. Once the apparatus is locked, the user simply shakes the egg cooking apparatus 1. The shaking motion causes the shells of the eggs to become loosened as the eggs interact with the peeling protrusions 20 of the top tray 11. Once the eggs are shook, the use then opens the devices and removes the shelled eggs which are now ready to eat.

Figure 1:
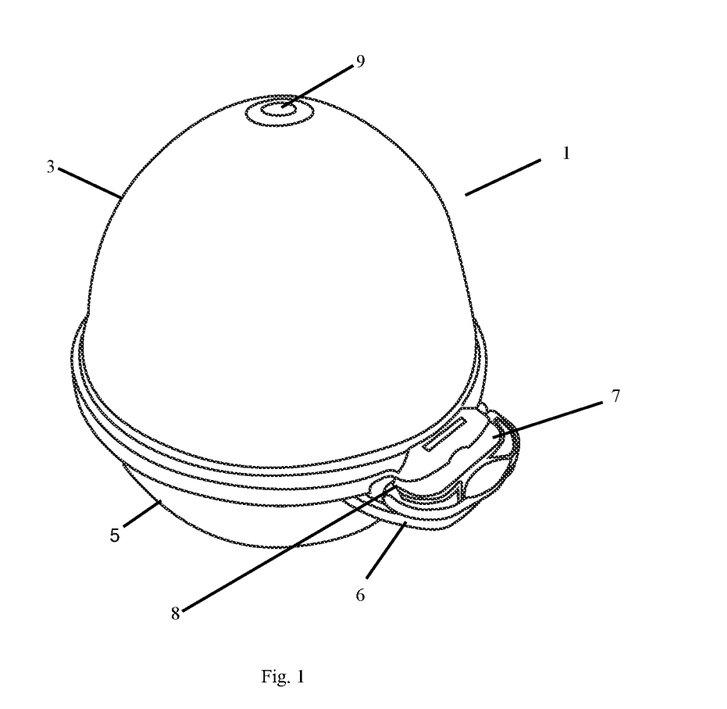
FIG. 1 is a perspective view of one of the embodiments of the present invention.

FIG. 1 shows a side view of the egg apparatus 1 having a first shell 3 and a second shell 5. It also depicts the pop valve 9 in a regular or closed position. It further shows the handle 6, lock 7 (in an unlocked position), and the pivot point 8. The pivot point 8 connects the lock 7 to the handle 6 and allows the handle to move from an unlocked position where it is parallel and resting on the handle 6 to a locked position where it moves over the lock protrusions 4 to create a seal in the internal cavity 2 for the cooking and egg peeling process.

Figure 2:
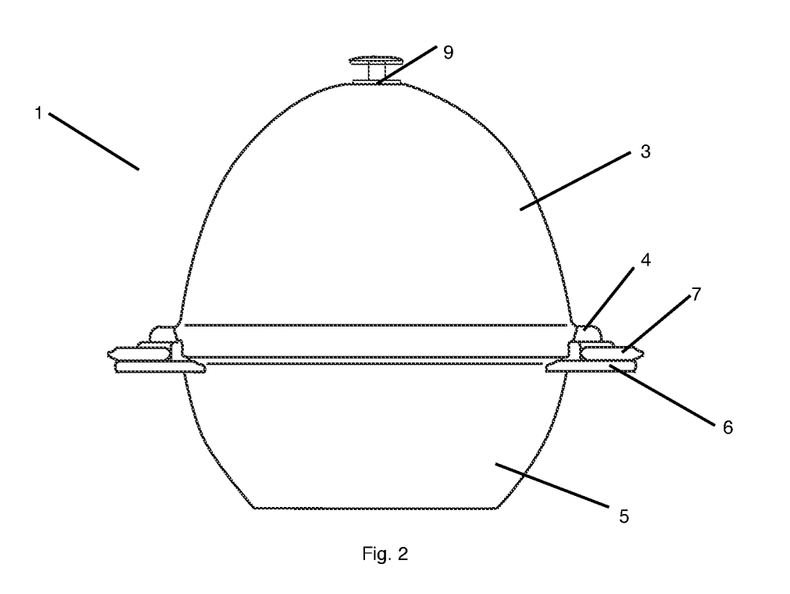
FIG. 2 is a front view of an embodiment of the egg apparatus showing the handles in an unlocked position and the pop valve in an open position.

FIG. 2 shows a front view of the egg apparatus 1 with the locks 7 in an unlocked position. It further shows the pop valve 9 in an open or escape position. The pop valve 9 moves to the open or escape position when an excess of pressure builds up inside the internal cavity 2 to allow the pressure to release and prevent mechanical failure and/or damage to the egg apparatus 1. The scenario where excess pressure could occur would be if the slits or perforations on the pop valve 9 become blocked, clogged or stuck together. In the event such a scenario occurs, then the pop valve 9 opens to allow the excess pressure to escape and preventing damage to the egg apparatus 1 and avoiding any injury or damage to surrounding objects or people.

Figure 3:
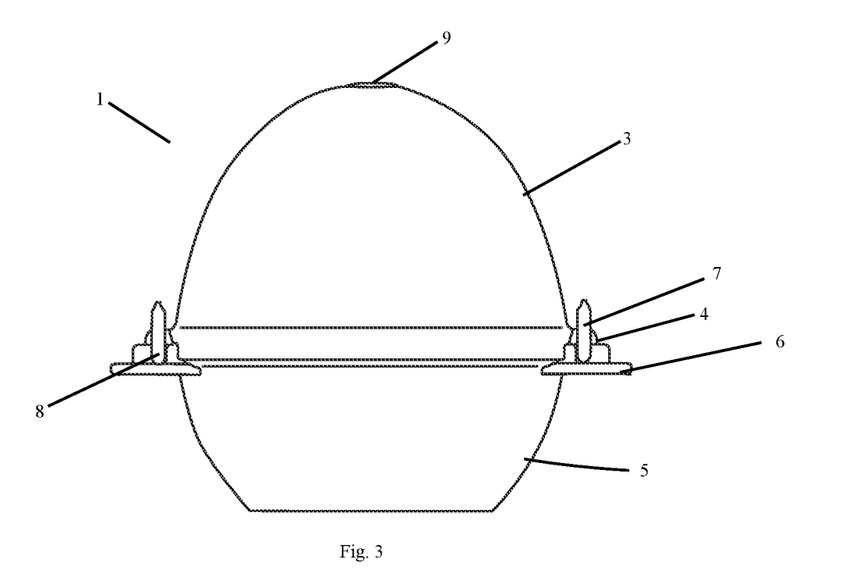
FIG. 3 is a front view of an embodiment of the egg apparatus of the present invention showing the handles in a locked position and the pop valve in a normal or closed position.

FIG. 3 depicts a front view of the egg apparatus 1 with the locks 7 in a locked position where they are engaged with the lock protrusions 4. This locked position helps create a sealed internal cavity 2, wherein the seal 19 of the inner channel 18 engages pressure (or a tight fit) on the bottom of the top shell 3.

Figure 4:
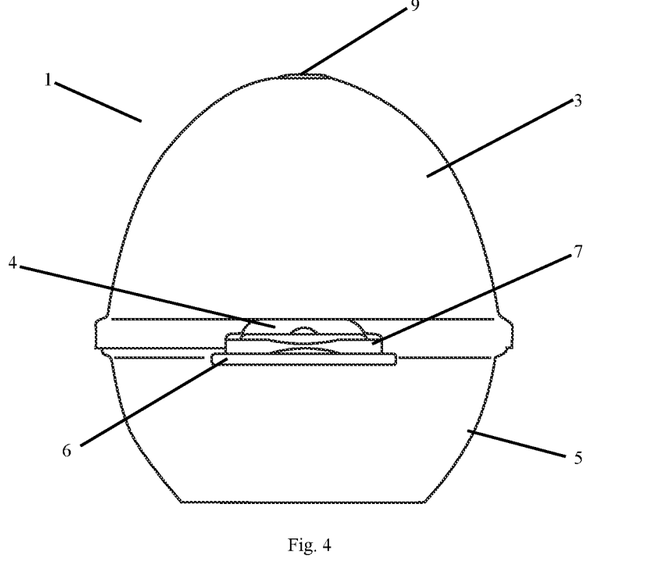
FIG. 4 is a side view of an embodiment of the egg apparatus.

FIG. 4 depicts a side view of the egg apparatus 1 with the locks 7 in an unlocked position and the pop valve 9 in the normal or closed position.

Figure 5:
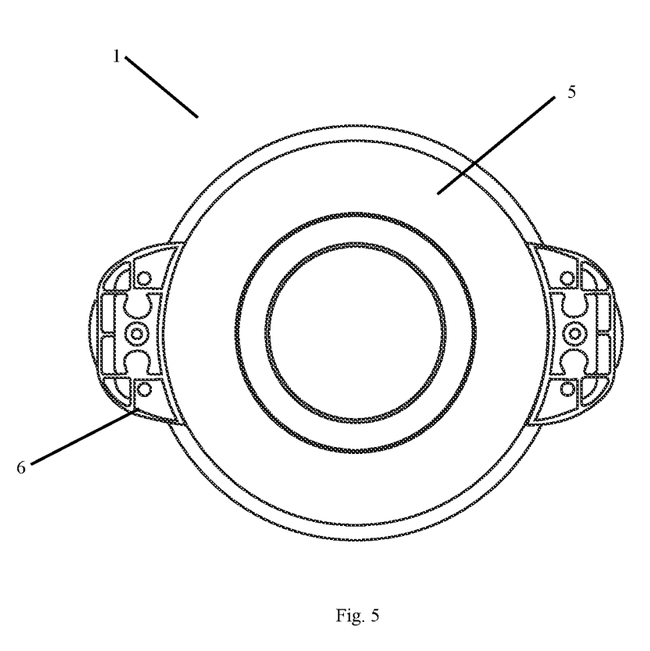
FIG. 5 is a bottom view of an embodiment of the egg apparatus.

FIG. 5 depicts a bottom view the egg apparatus 1.

Figure 6:
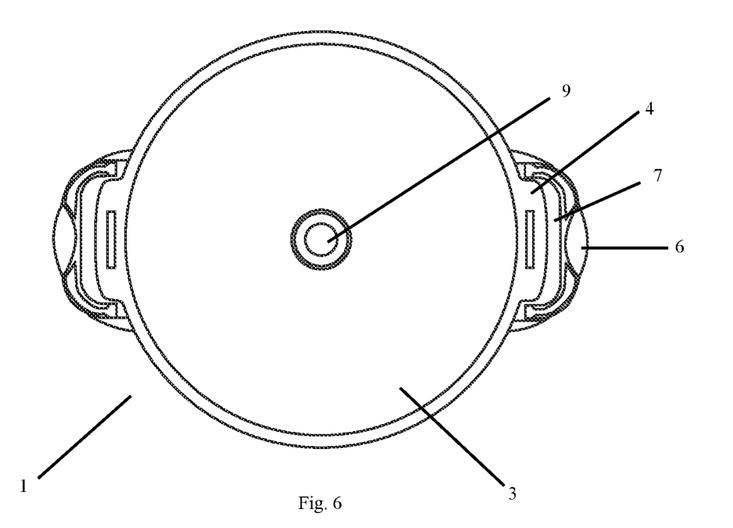
FIG. 6 is a top view of an embodiment of the egg apparatus.

FIG. 6 depicts a top view of the egg apparatus 1 with the locks 7 in an unlocked position and the pop valve 9 in the normal or closed position.

Figure 7:
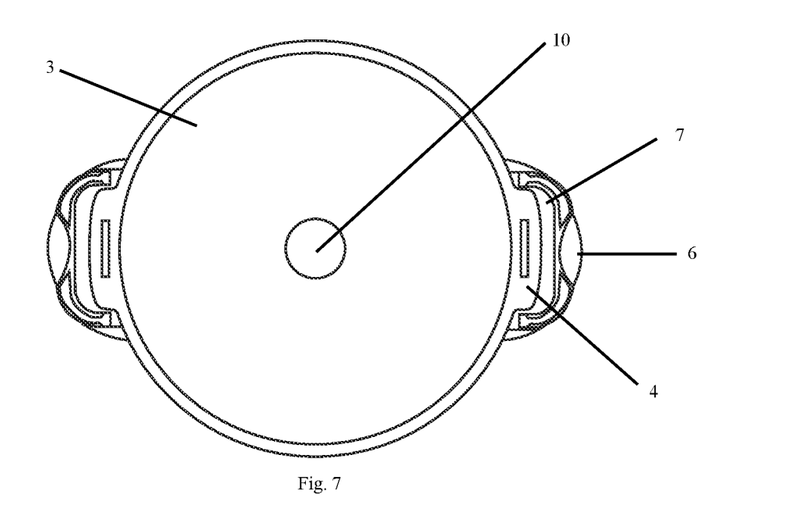
FIG. 7 is side view of an embodiment showing the present invention with two motors and a battery.

FIG. 7 depicts a top view of the egg apparatus 1 with the locks 7 in an unlocked position and the pop valve 9 removed from the apparatus and showing the pop valve hole 10 empty.

Figure 8:
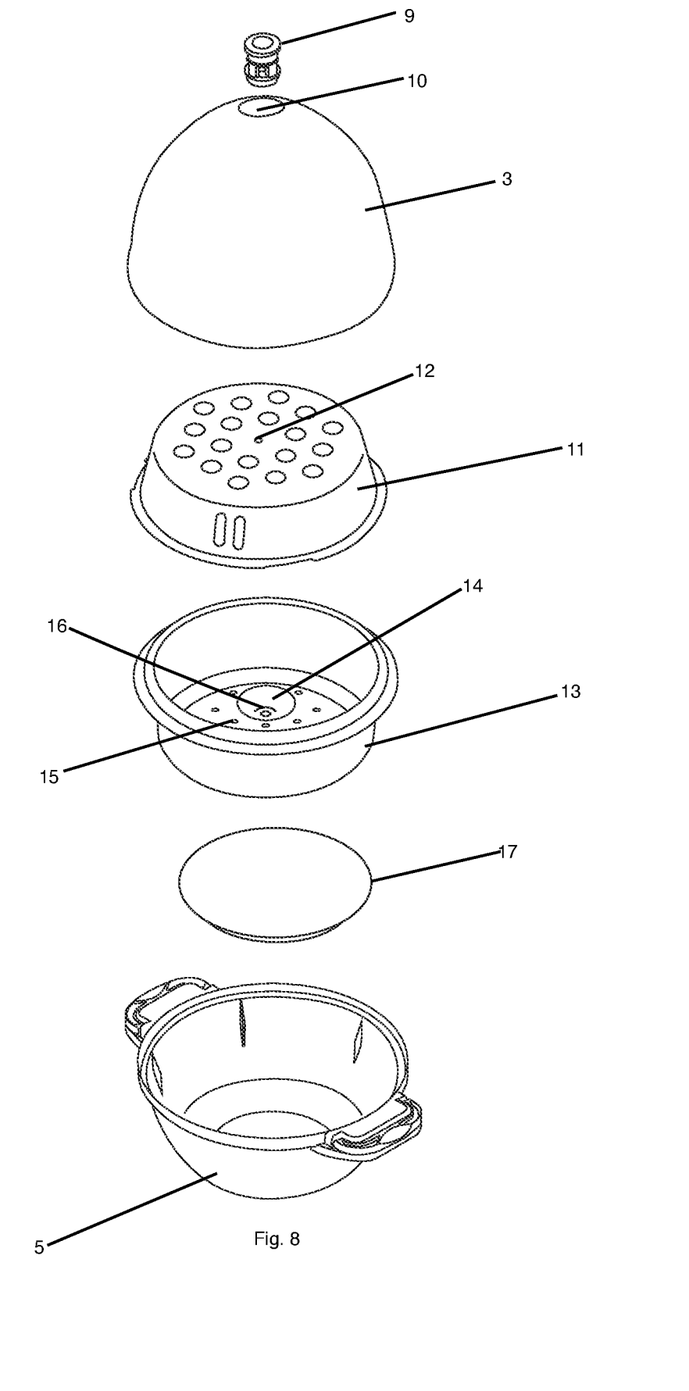
FIG. 8 is an exploded view of an embodiment of the egg apparatus.

FIG. 8 depicts an exploded view of the egg apparatus 1. It shows the second shell 5, which is designed to receive water, an internal base 17, a bottom tray 13 having an egg cup 14, vent(s) 15, and fill line indicator 16. FIG. 8 further shows first shell 3 that receives top tray 11 with air passage 12 and the pop valve 9 through the pop valve hole 10.

Figure 9:
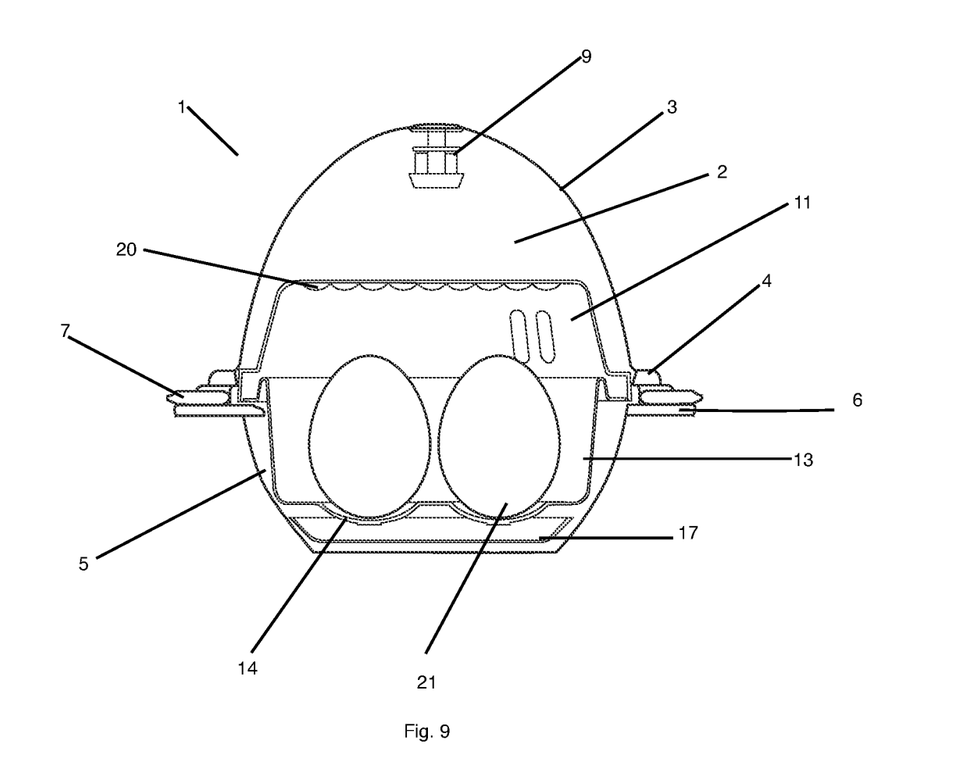
FIG. 9 is a cut away view of an embodiment of the egg apparatus.
Figure 10:
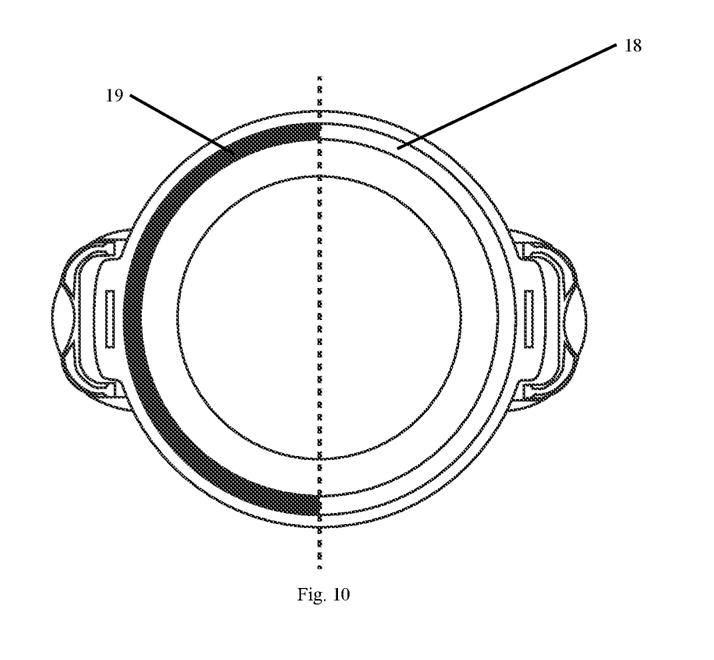
FIG. 10 is a to view of the bottom shell bisected down the middle showing the inner channel with and without a seal (left side shows seal and right side shows no seal).

FIG. 9 depicts a cut away view of the egg apparatus 1. This cut away view shows the arrangement of the parts and how they are positioned relative to one another in the internal cavity 2. As can be seen from FIG. 8 the internal base 17 sits atop or is adjacent to the bottom of the bottom shell 5. The bottom tray 13 rest atop or adjacent the internal base 17. The internal base has two eggs 20 that are sitting in the egg cups 14 of the bottom tray. The top tray 11 can be seen having peeling protrusion 20 the extend away from the top of the tray and down towards the bottom tray 13. The peeling protrusions 20 allow a user to shake the eggs in a locked egg apparatus 1 that efficiently and effectively removes the shells from the cooked eggs. It further shows the location of the pop valve 9 inside the pop valve hole 10 in a regular or closed position.

Numerous modifications and variations of the present invention are possible in light of the above teachings. It is therefore to be understood that within the scope of the attendant claims attached hereto; this invention may be practiced otherwise than as specifically disclosed herein.

What is claimed is:

1. An egg apparatus comprising:
at least two shells designed to attach and detach from another, said at least two shells forming a sealed internal cavity when attached to one another, at least one of said at least two shells having at least one aperture;
a top tray, a bottom tray and an internal base designed to be received by said sealed internal cavity, said bottom tray is designed to receive an egg, said at least one of said at least two shells is designed to receive water which may be heated to cook the egg;
a plurality of protrusions extending downwardly from said top tray, said plurality of protrusions are designed to deshell the egg;
a handle attached to one of said at least two shells;
a lock designed to secure said at least two shells to one another to thereby form said sealed internal cavity; and
a pop valve designed to fit within said at least one aperture of said at least one of said at least two shells, said pop valve is designed to let steam escape and keep water inside said sealed internal cavity.

2. The apparatus of claim 1 further comprising at least one egg and water.

3. The apparatus of claim 1 wherein said first shell is the top shell and said second shell is the bottom shell when said at least two shells are attached to one another.

4. The apparatus of claim 3 where said handle to directly attached to said bottom shell.

5. The apparatus of claim 3 wherein said top tray at least one air passage.

6. The apparatus of claim 3 wherein said bottom tray has at least one egg cup to receive an egg.

7. The apparatus of claim 6 wherein the egg sits within said egg cup of said bottom tray, said top tray is placed over said bottom tray, said bottom tray sits on said internal base, said bottom trays and internal base are placed atop said bottom shell, water is poured into said bottom shell, said top tray and said top shell is attached to and locked onto said bottom shell creating a seal for said internal cavity, said apparatus is heated to allow the egg to cook, said egg apparatus is shaken to allow said plurality of protrusions to deshell the egg, and the top and bottom shells are unlocked and opened to access the egg.

8. The apparatus of claim 3 wherein a top portion of said bottom shell comprises a channel, said channel is designed to receive at least one seal, said channel and said seal are designed to receive a bottom portion of said top shell to create a water and steam tight seal for said internal cavity.

9. The apparatus of claim 1 is designed to steam cook and deshell at least one egg in a microwave.

10. The apparatus of claim 1 wherein said bottom tray comprises at least one vent.

11. The apparatus of claim 1 wherein said bottom tray comprises a fill line indicator that indicates to a user how much water should be poured into said egg apparatus.

12. The apparatus of claim 1 wherein said pop valve comprises a device for releasing steam, said device is selected from the group consisting of slits, perforations, holes and combinations thereof.

13. The apparatus of claim 1 wherein said pop valve is designed to slide out of said at least one aperture if too much pressure builds within said internal cavity.

14. The apparatus of claim 1 wherein said bottom tray rests on said internal base.

15. An egg apparatus comprising:
a top shell and a bottom shell designed to attach and detach from another, said top and bottom shells forming a sealed internal cavity when attached to one another, said top shell having at least one aperture;
said top shell comprising at least one top tray, said bottom shell comprising at least one bottom tray and an internal base, said bottom tray is designed to receive an egg, said bottom shell is designed to receive water which is heated to cook the egg;
a plurality of protrusions extending downwardly from said top tray, said plurality of protrusions are designed to deshell the egg;
a handle attached to said bottom shell;
a lock designed to secure said top and bottom shells to one another to thereby form said sealed internal cavity; and
a pop valve designed to fit within said at least one aperture of said top shell, said pop valve is designed to let steam escape and keep water inside said sealed internal cavity.

16. The apparatus of claim 15 wherein said bottom tray comprises at least one egg cup.

17. The apparatus of claim 16 wherein said bottom tray comprises a plurality of egg cups for holding a plurality of eggs.

18. The apparatus of claim 17 wherein the egg sits within said egg cup of said bottom tray, said top tray is placed over said bottom tray, said bottom tray sits on said internal base, said bottom trays and internal base are placed atop said bottom shell, water is poured into said bottom shell, said top tray and said top shell is attached to and locked onto said bottom shell creating a seal for said internal cavity, said apparatus is heated to allow the egg to cook, said apparatus is shaken to allow said plurality of protrusions to deshell the egg, and said top and bottom shells are unlocked and open to access the egg.

19. The apparatus of claim 18 wherein said pop valve comprises a device for releasing steam, said device for releasing steam is selected from the group consisting of slits, perforations, holes and combinations thereof.

* * * * *